June 11, 1940. M. M. SAFFORD 2,204,383
MANUFACTURE OF PRINTING ROLLS
Original Filed Oct. 25, 1935
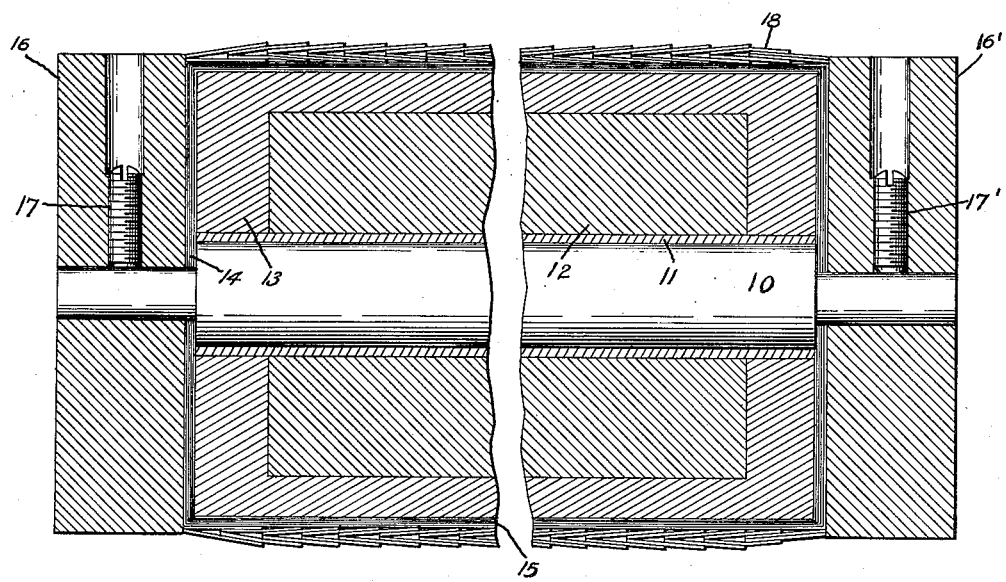
Inventor:
Moyer M. Safford,
by Harry E. Dunham
His Attorney.

Patented June 11, 1940

2,204,383

UNITED STATES PATENT OFFICE 2,204,383

MANUFACTURE OF PRINTING ROLLS

Moyer M. Safford, Schenectady, N. Y., assignor to General Electric Company, a corporation of New York Original application October 25, 1935, Serial No. 46,686. Divided and this application April 8, 1937, Serial No. 135,750

5 Claims. (Cl. 91—67.8)

This application is a division of my copending application Serial No. 46,686, filed October 25, 1935, now Patent 2,160,230 dated May 30, 1939, which is assigned to the assignee of the present application and relates to new and useful resinous compositions and to methods of preparing the same. The present application is directed specifically to the utilization in the printing field of such resinous compositions.

As described in the above patent I have discovered that alkyd resins are compatible with compounds which are, generally speaking, plastic polymers of chloroprene and that compositions prepared from these ingredients are chemically resistant to such materials as oils, hydrocarbon solvents and printing inks. In addition, such compositions may be prepared so as to possess the properties of resiliency and flexibility of ordinary rubber. The compositions can be compounded in accordance with standard rubber practice and lend themselves to practical use as rubber substitutes.

The term "chloroprene" as used herein designates the chemical compound chloro-2-butadiene 1,3. The latter may be prepared, for instance, from monovinyl acetylene and hydrochloric acid. Upon subjection to ultra-violet light, plastic polymers of chloroprene are produced. Such polymers are obtainable on the market under the trade-name "Du Prene" and may be compounded with various organic and inorganic modifying agents as hereinafter more fully described.

Alkyd resins, as is well known, comprise those complexes resulting from the interaction of a polyhydric alcohol, such as glycerine, and a polybasic acid, such as phthalic acid or its anhydride, with or without other reacting ingredients. The term "alkyd resin," as used herein includes the resinous condensation product resulting from the reaction of one or more polyhydric alcohols, one or more polybasic acids with or without one or more of the following ingredients: drying oils, semi-drying oils, non-drying oils, the acids derived from such oils, especially the acids derived from drying oils, with or without other ingredients such as natural resins or other synthetic resins.

In the following specification the term "alkyd resin-polychloroprene compositions" is used to designate the various compositions containing alkyd resin and plastic polymers of chloroprene.

In order that the invention may be understood and practiced by those skilled in the art to which it pertains, the following detailed description is given and its scope pointed out in the appended claims.

In the accompanying drawing forming a part of the present application the figure represents a view in side elevation and partly in section, of a printer's roll with a curing wrapping and end mold therefor.

Referring more specifically to the preparation of the alkyd resin-polychloroprene compositions, one method of preparing the same is as follows:

A cured (C-stage) alkyd resin is first passed continuously through ordinary type rubber mixing rolls which are set together and which are cold. The resin is milled until it can be taken off the fast roll in a good strong sheet (strong enough to support its own weight when pulled from the roll horizontally for a distance of approximately one foot). It should not stick to the slow roll. The resin is then taken from the rolls.

The compound containing plastic polymers of chloroprene is then mixed on the rolls until thoroughly broken down after which the milled alkyd resin is slowly added thereto. When it has all been added the composition is milled for sufficient time to insure a uniform mass. Usually, a period of twenty minutes will be sufficient but this may vary depending on the quantity of material being milled and the size of the mill.

Any proportion of alkyd resin and chloroprene polymers may be taken, the specific proportions chosen being dependent on the nature of the final product desired and the use to which it is to be put.

The alkyd resin-polychloroprene compositions may be cured in dry heat in an air-ventilated oven at an elevated temperature, for example, at 150° C. for a period of time dependent on the composition used and on the thickness of the mass. For example, a ¼" slab of material will require from about 1 to 5 hours at the above temperature for cure. The correct time of cure can easily be determined by experiment in each case.

By way of illustration the following example gives a specific combination which has been found useful in the manufacture of printing rolls.

Per cent by weight
Compound containing plastic polymers of
 chloroprene_____ 10.0
Alkyd resin _____ 89.0
Flexible phenol-aldehyde resin_____ 1.0

The flexible phenol-aldehyde resin may be of the oil-modified type described, for example, in Byck Patent No. 1,590,079.

The compound containing plastic polymers of chloroprene may consist of the following ingredients:

| | Per cent by weight |
|---|---|
| Plastic polymers of chloroprene | 60.3 |
| Litharge | 12.1 |
| Sulphur | 0.6 |
| Rosin | 3.2 |
| Anti-oxidant (Neozone D) | 1.2 |
| Zinc oxide | 6.0 |
| Cumar resin | 8.3 |
| Medium mineral oil | 8.3 |

The alkyd resin which is carried to the C-stage may be prepared from the following:

| | Per cent by weight |
|---|---|
| Glycerine | 4.91 |
| Phthalic anhydride | 11.84 |
| Ethylene glycol | 24.83 |
| Adipic acid | 58.42 |

As an example of the preparation of an alkyd resin for use in making the alkyd resin-polychloroprene composition in accordance with the present invention the following is given:

A polyhydric alcohol, such as glycerine, a polybasic acid such as phthalic anhydride, a dihydric alcohol such as ethylene glycol, and a dibasic aliphatic acid such as adipic acid, are reacted together to form a resin in accordance with the procedure set forth in Kienle and Rohlfs Patent 1,897,260. The ratio of glycol adipate to glycerol phthalate is chosen in accordance with the characteristics desired in the final resin. The ratio of proportions may be 2½:1, 3½:1, 6:1, or even as high as 15:1.

The printer's roll shown in the drawing may be constructed by applying on any suitable core or mandrel 10 a thin coating base of hard rubber or suitable cement 11. The core or mandrel may be of any suitable material, for example, steel. On this core, over the hard rubber or cement layer, is applied a coating of soft rubber 12. The thin coating base of hard rubber or cement is employed because the soft rubber coating will not adhere satisfactorily to the steel. The rubber coatings are applied to the mandrel and cured or vulcanized in accordance with the usual rubber roller technique. The rubber after curing should be able to withstand an additional cure without appreciable deterioration or hardening.

Alkyd resin-polychloroprene composition 13, prepared in accordance with the method described above, is next tightly wrapped in sheet form over the rubber base and the ends thereof. The ends being wound from the mandrel up to the surface of the rubber base. It is preferred to use sheets about 1/16 inch thick and to apply sufficient wrapping so that the final roll will have an alkyd resin-polychloroprene coating about ¼ inch thick. The rollers are built up to about ⅛ inch or more in diameter over the size desired to allow for finishing.

Three or four oversize paper washers 14 are next slipped over the ends of the mandrel. The washers are folded neatly over the surface of the roller and held on the roller surface by means of several layers of paper 15. End plates 16 and 16' are now attached to the ends of the mandrel and secured by means of hollow head set screws 17 and 17'. The roller is tightly bound over the surface of the snugly wound paper with suitable tape 18. Open weave tape, 2 inches wide, wound with a ½ inch overlap, has been found satisfactory.

The roll is then cured or vulcanized by dry heat in an air-ventilated oven. Assuming that the roller has an alkyd resin-polychloroprene coating ¼ inch in thickness, a heat treatment for about 1 to 5 hours at a temperature of approximately 150° C. has been found to give a satisfactory cure. The correct time of curing will depend upon the particular composition employed and upon the wall thickness desired and can be determined easily by experiment in each case. If desired the rubber coating on the mandrel may be cured or vulcanized simultaneously with the alkyd resin-polychloroprene composition.

The rollers should be allowed to cool to room temperature before the tape and paper are removed. The tape may be saved and used over again several times before it is unfit for further use. The cured roller is placed upon an arbor and locked in place. It is ground dry preferably with a medium 40 mesh wheel at a peripheral speed of about 3600 ft. per minute. The roller is then polished on a high speed lathe, using talcum powder and No. 2 emery paper. Extreme caution should be used at all times to keep the roller free from foreign particles and dirt, particularly when the roller is being wound before a cure.

The printing rolls having a coating surface of alkyd resin-polychloroprene composition are not subject to deterioration and distortion caused by oil absorption from the ink and thus give accurate printing. By controlling the kind and amount of alkyd resin to be used in the alkyd resin-polychloroprene composition the desired resiliency is easily obtainable.

While I have illustrated my invention with a specific example, it is to be understood that my invention is not limited thereto. All modifications coming within the true spirit and scope of my invention are meant to be covered by the appended claims.

What I claim as new and desire to secure by Letters Patent of the United States, is:

1. The method of making a printing roll which comprises winding on a core provided with a partially vulcanized soft rubber surface the requisite number of layers of a composition comprising alkyd resin and plastic polymers of chloroprene, securing the end surfaces of the roll and tightly binding the resin surface with a porous covering, vulcanizing in dry heat to the desired surface hardness, cooling, removing the coverings and machining the roller surface to size.

2. The method of making a printing roll which comprises applying on a core a thin coating of material to which soft rubber will adhere, then applying thereon the soft rubber, vulcanizing, wrapping in sheet form over the soft rubber base a composition comprising plastic polymers of chloroprene and flexible alkyd resin, wrapping the whole with a porous covering and securing the ends of the roll against lateral movement, curing the resin and rubber compositions under heat, cooling to room temperature, removing the porous covering and machining the roller surface to size.

3. A printing roll comprising a core surfaced with a resilient, rubber-like, oil-resistant layer of substantial thickness comprising the product of vulcanization under heat of a composition containing alkyd resin, plastic polymers of chloroprene and vulcanizing agent.

4. A printing roll comprising a core surfaced with a resilient, rubber-like, oil-resistant layer of substantial thickness comprising the product of vulcanization under heat of a composition containing alkyd resin, plastic polymers of chloroprene and vulcanizing agent, said alkyd resin being the product of reaction of glycerine, phthalic anhydride, glycol and dibasic aliphatic acid.

5. A printing roll comprising a core, a layer of resilient material on said core and a resilient, rubber-like, oil-resistant surface layer of substantial thickness comprising the product of vulcanization under heat of a composition containing alkyd resin, plastic polymers of chloroprene and vulcanizing agent, said alkyd resin being the product of reaction of glycerine, phthalic anhydride, glycol and dibasic aliphatic acid.

MOYER M. SAFFORD.

DISCLAIMER 2,204,383.—*Moyer M. Safford*, Schenectady, N. Y. MANUFACTURE OF PRINTING ROLLS. Patent dated June 11, 1940. Disclaimer filed August 21, 1943, by the assignee, *General Electric Company*.

Hereby disclaims all claims of said patent.

[*Official Gazette September 21, 1943.*]